United States Patent [19]

Ueno et al.

[11] Patent Number: 5,171,774
[45] Date of Patent: Dec. 15, 1992

[54] PTC COMPOSITIONS

[75] Inventors: Akira Ueno, Yokohama; Mayumi Takata, Tokyo; Naoki Yamazaki, Tokyo; Syoiti Sugaya, Tokyo, all of Japan

[73] Assignee: Daito Communication Apparatus Co. Ltd., Tokyo, Japan

[21] Appl. No.: 441,838

[22] Filed: Nov. 22, 1989

[30] Foreign Application Priority Data

Nov. 28, 1988 [JP] Japan .................... 63-300222

[51] Int. Cl.$^5$ ............................... C08K 3/04
[52] U.S. Cl. ................... 524/495; 524/496; 252/511; 423/460; 502/432
[58] Field of Search ............ 524/495, 496; 252/511; 423/460; 502/432

[56] References Cited

U.S. PATENT DOCUMENTS

| 4,188,276 | 2/1980 | Lyons et al. | 524/530 |
| 4,367,168 | 1/1983 | Kelly | 252/511 |
| 4,388,607 | 6/1983 | Toy et al. | 252/511 |
| 4,631,180 | 12/1986 | Yoshimura et al. | 423/460 |

FOREIGN PATENT DOCUMENTS 48-035696  5/1973  Japan .

Primary Examiner—Paul R. Michl
Assistant Examiner—Edward S. Cain
Attorney, Agent, or Firm—Morrison Law Firm

[57] ABSTRACT

A product having a positive temperature coefficient of resistance is formed by etching a carbon black at an elevated temperature to remove less crystalline portions and thereby to increase the specific surface area of the carbon black. The resulting carbon black is called porous carbon black. The porous carbon black is blended with a crystalline polymer to form a product having the desired positive temperature coefficient of resistance. Production of a material suitable for use as a resettable fuse is described.

7 Claims, 13 Drawing Sheets

PTC COMPOSITIONS

BACKGROUND OF THE INVENTION

1. Field of the Invention

The present invention relates to PTC (positive temperature coefficient) compositions consisting of conductive polymer compounds to be used as a self-resetting overcurrent protection device utilizing the PTC characteristics thereof.

2. Description of the Prior Art

Carbon black, the specific surface area of which is increased at the time of its formation, is well known as is the method described in Japanese Patent Laid-Open No. 24455/1981. It is also known that highly conductive compositions can be obtained by combining such carbon black with resin.

Also known is conductive resin compositions as described in Japanese Patent Publication No. 35696/1973. Such composition include resin and carbon powder with large surface area which is a by-product produced by partly oxidizing a hydrocarbon in steam in order to obtain a gas mixture heavy in hydrogen and carbon monoxide.

It is also well known that conductive compositions can be obtained by blending carbon black having a large specific area as shown in table 1 with resin.

TABLE 1

| Carbon Black (Grade) | (Name of Manufacture) | Particle Diameter (m$\mu$) | Specific Surface Area (m$^2$/g) |
|---|---|---|---|
| Black Pearls 2000 | Cabot Corporation | 15 | 1475 |
| Conductex 40-220 | Colombian Carbon Japan Ltd. | 20 | 1066 |
| Ketjen Black EC | Ketjen Black International Corporation | 30 | 950 |

Highly conductive carbon black described in the references Japanese Patent Laid-Open No. 24455/1981 is characterized by a low volume resistivity $\rho$ at the time of being blended with resin and a small change of $\rho$ due to temperature. Therefore, this carbon black is unsuitable for use as a conductor for a self-resetting overcurrent protection device which takes advantage of its PTC behavior, i.e. the sharp change in $\rho$ in response to changes in temperature.

Conductive resin compositions described in Japanese Patent Publication No. 35696/1973 utilize carbon black with a large specific surface area. However, its purpose is to obtain conductive resin compositions with improved conductivity as well as high mechanical strength by means of blending only a small amount of carbon black.

Figure 17:
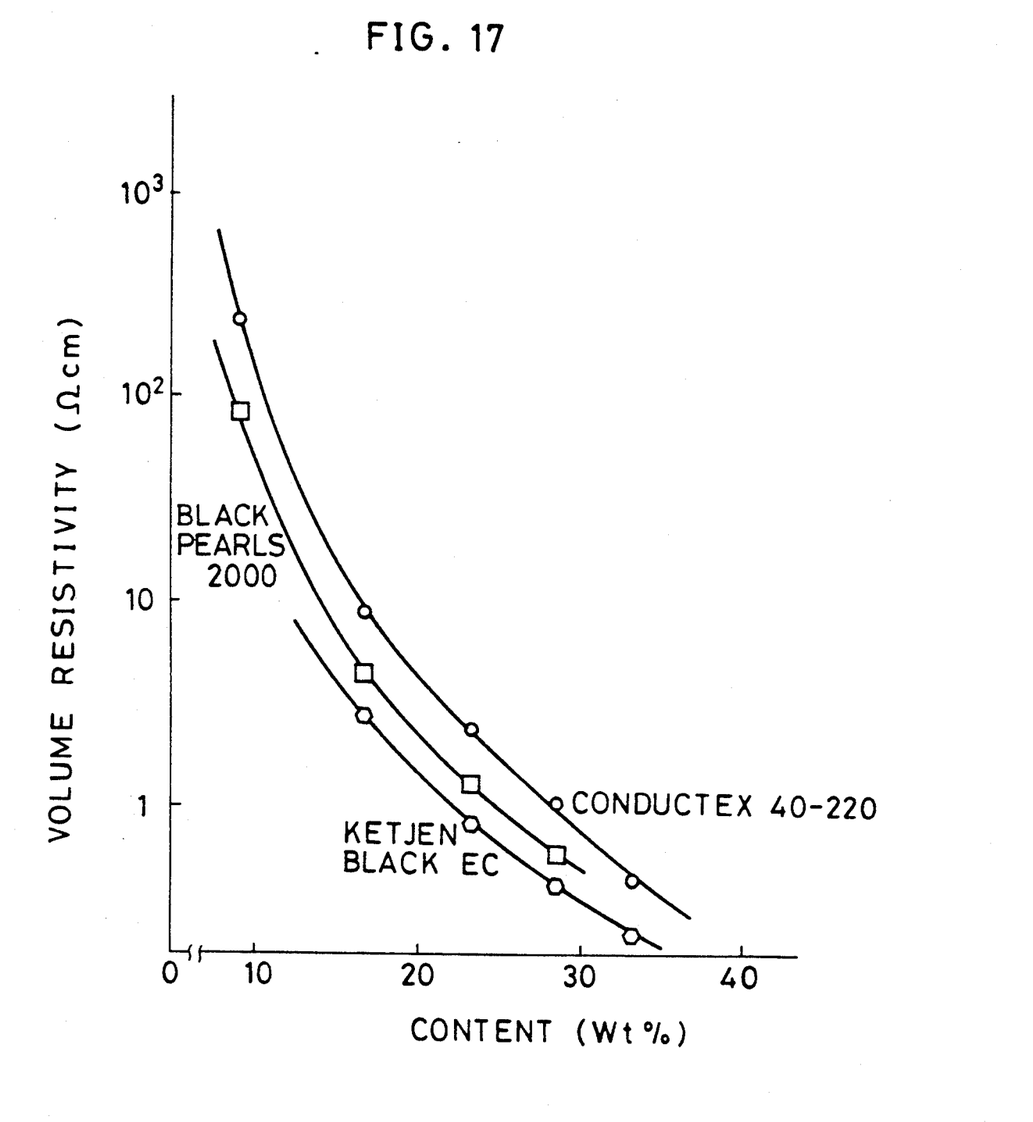
FIG. 17 is a chart showing carbon black content and volume resistivity in cases where conventional conductive carbon blacks are blended with polyethylene.

Further, when carbon black with a large specific surface area, such as those mentioned in Table 1, is blended, in various content ratios, with resin (polyethylene) and shaped, any such shaped article has, as indicated in FIG. 17, high electrical conductivity with relatively low content of carbon black. As shown in Table 6, however, such composition presents a problem in that it has low PTC characteristics, i.e. the rate of drastic increase of resistivity occuring around the melting point of the resin in question.

SUMMARY OF THE INVENTION

An object of the present invention is to provide highly conductive PTC composition with high PTC characteristics that are suitable for use in a self-resetting overcurrent protection device.

PTC composition according to the present invention comprises porous carbon black, dispersed in a crystalline polymer. The carbon black is made porous by means of the vapor etching method to increase its specific surface area.

The porous carbon black has its specific surface area increased by more than 1.5 times that of unmodified carbon black.

Oil furnace blacks or lamp blacks are used as the unmodified carbon blacks.

Furthermore, the volume resistivity of the PTC compositions at 20° C. is in the range of 0.4 ohm cm ~ 150 ohm cm.

The vapor etching method used for producing porous black according to the present invention calls for placing carbon black in a high temperature and, by means of carbon dioxide gas, steam or other suitable gas, preferentially and selectively etching less crystallized areas thereof to make it porous, thus increasing its specific surface area. According to the method, the specific surface area of carbon black can be increased without substantially changing its particle size and/or structure.

Figure 1:
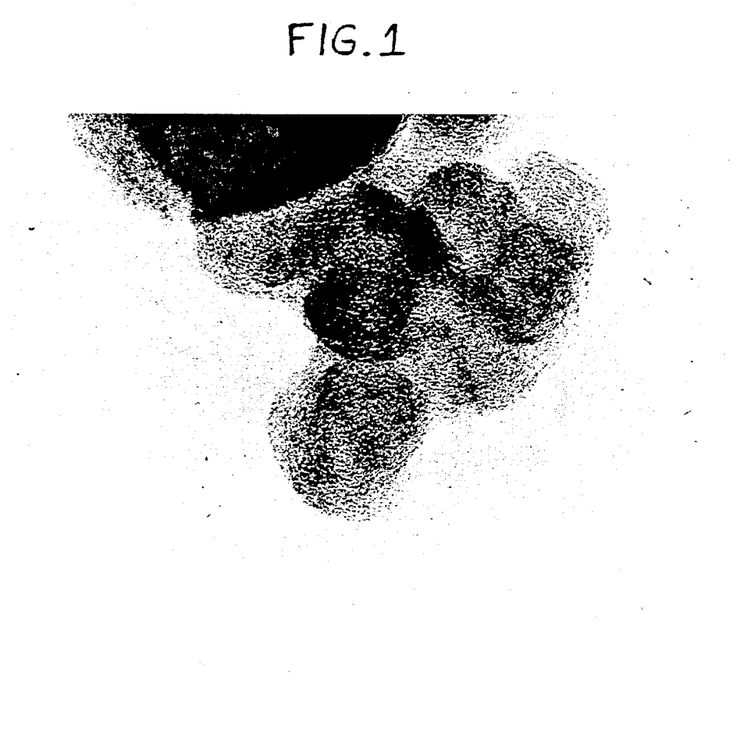
FIGS. 1 and 2 are electron microscope photographs of the particles of the original carbon black.
Figure 2:
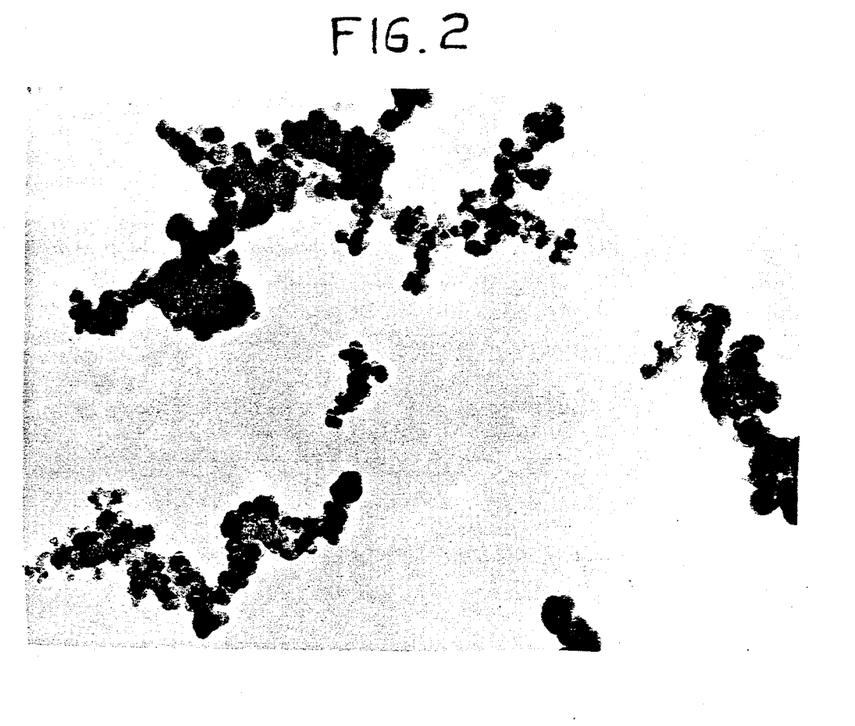
Figure 3:
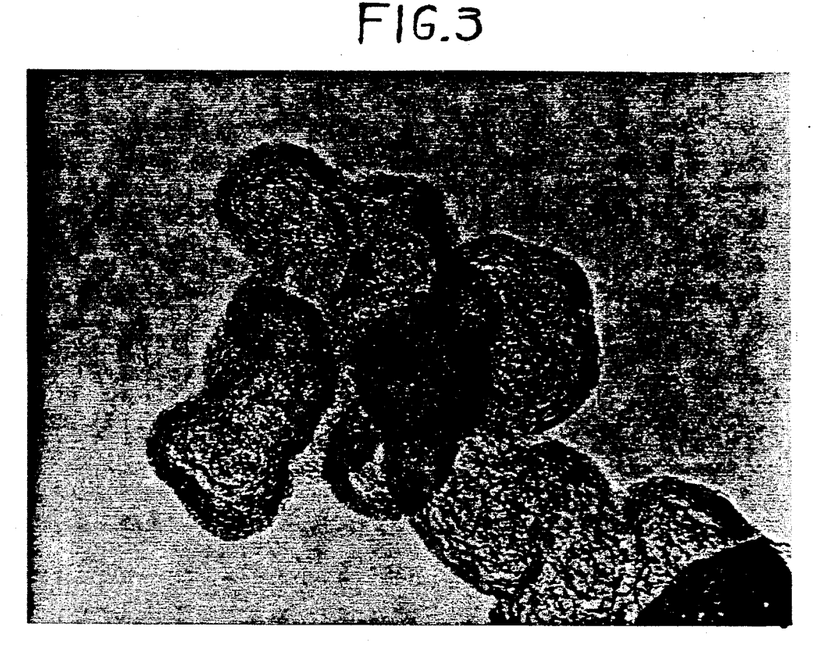
FIGS. 3 and 4 are electron microscope photographs of the particles of porous black.
Figure 4:
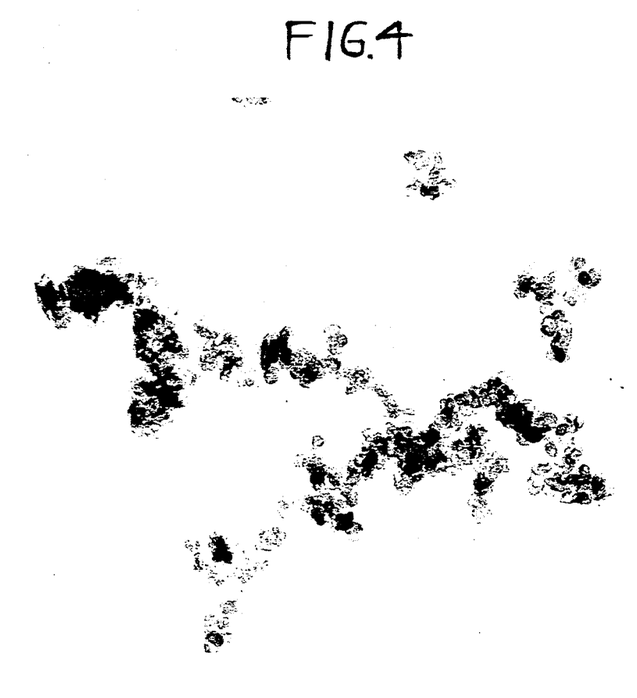

Referring to FIGS. 1 and 2, which are electron microscope photographs of 500,000 magnifications and 25,000 magnifications respectively of unmodified carbon black with specific surface area of 45 m$^2$/g, as well as FIGS. 3 and 4, which are similarly magnified photographs of porous black (specific surface area:983 m$^2$/g), it is evident that there is no significant change in appearance of the carbon black after the treatment.

The reaction formula of the vapor etching treatment utilizing carbon dioxide gas is shown as $C+CO_2=2CO$. The temperature at which the normal free energy thereof $\Delta G°$ attains a state where $\Delta G° \approx 0$ is approximately 706° C. Above this temperature, said formula moves towards the right.

Figure 5:
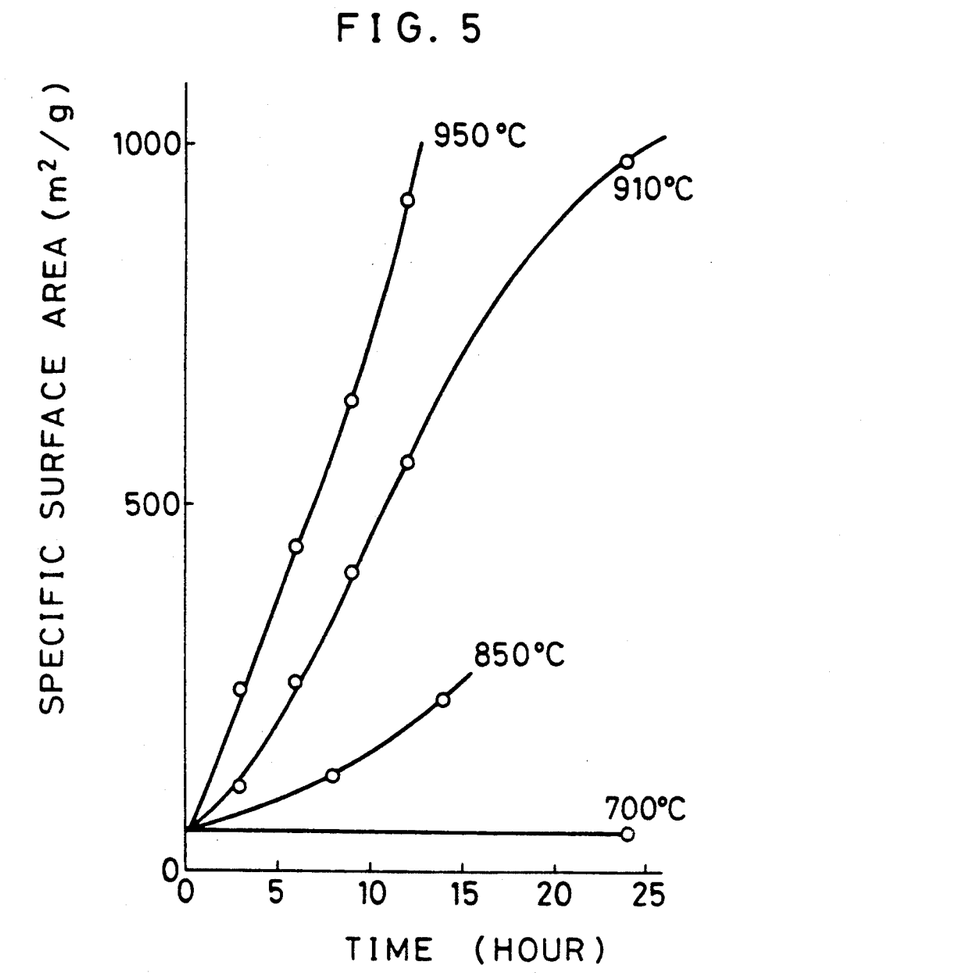
FIG. 5 is a chart showing temperatures of vapor etching treatment and specific surface areas of porous black obtained thereby.

FIG. 5 indicates the relation between temperature and specific surface area of carbon black made porous in a carbon dioxide gas current, by means of the vapor etching method. It is evident from FIG. 5 that, above 700° C., the specific surface area drastically increases together with an increase in reaction temperature.

Further, in the range of 0.4 ohm cm ~ 150 ohm cm, the volume resistivity at 20° C. ($\rho_{20}$) of PTC compositions according to the present invention reaches substantially the same level as the rated current value of a normal fuse.

As for rated current Ic for normal fuses, those in the range of several dozen mA to several dozen A are common. In order to design a self-resetting overcurrent protection device to fit in said range, the desired volume resistivity at 20° C. ($\rho_{20}$) has been computed with the results shown in Table 2.

TABLE 2

| Volume Resistivity ($\rho$) ($\Omega$cm) | Shape of Element (Thickness: 0.05) (cm) | PTC Element Resistance ($\Omega$) | Watt Loss (W) | Rated Current Ic (A) |
|---|---|---|---|---|
| 0.4 | 2 × 2 × 0.05 | 0.005 | 2 | 20.0 |
| | 1 × 1 × 0.05 | 0.02 | 1 | 7.07 |
| | 0.3 × 0.3 × 0.05 | 0.22 | 0.3 | 1.17 |
| 150 | 2 × 2 × 0.05 | 1.88 | 2 | 1.03 |
| | 1 × 1 × 0.05 | 7.50 | 1 | 0.365 |
| | 0.3 × 0.3 × 0.05 | 83.3 | 0.3 | 0.060 |

The above Table 2 indicates that the rated current can be designed in the range of 0.06A ~20A, the range of which is similar to that for rated current value of normal fuses.

DETAILED DESCRIPTION OF THE PREFERRED EMBODIMENT

Embodiments according to the present invention are described hereunder referring to Tables 3 and 4 accompanied hereto on separate sheets.

(1) Method of Production of PTC device

Porous black A-1, B-1 and 2, C-1, 2, 3, 4, 5, 6 and 7, D-1, E-1, 2 and 3, F-1, 2 and 3 and G-1, 2 and 3 are shown in Table 4, said porous black being produced by etching carbon blacks A, B, C, D, E, F and G shown in Table 3 under high temperatures of 900° C. ~950° C. by means of carbon dioxide gas or steam, thus increasing respective specific surface areas thereof by various magnitudes depending on the varying temperatures. (According to the 32nd and 47th embodiments, carbon blacks were made porous by means of steam treatment.) The numerals after said alphabetic symbols indicate that the respective magnitudes of specific surface areas are different.

The specific surface areas indicated have been measured according to ASTM D3037-88.

High density polyethylene (1300J with a melting point of 131 C: manufactured by Mitsui Petrochemical Industries) was used as the aforementioned crystalline polymer.

Figure 6:
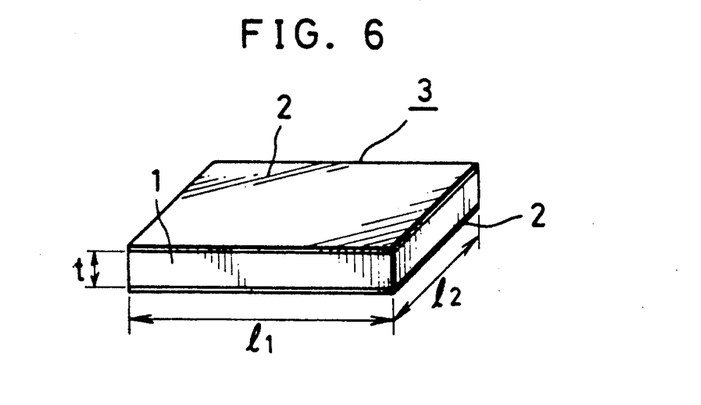
FIG. 6 is an oblique drawing of a PTC device of an embodiment according to the present invention.

Next, each of said porous black and said high density polyethylene (1300 J) were combined together according to the porous black content ratio shown in Table 4 and then blended together in a mixing test roller (manufactured by KODAIRA SEISAKUSHO Co., LTD.: 150 mmϕ×200 mmL) adjusted at 135° C.; the blended ingredients were processed into material for shaping, chips of approximately 1 mm in size, by means of a crusher (SPREC MINI F 180: manufactured by MATSUI SEISAKUSHO Co., LTD.) and a fine grinder (Wiley-W-100: manufactured by IKEDA RIKA Co., LTD.). Said material for shaping was shaped together with metallic foils (produced by FUKUDA METAL FOILS & POWDER Co., LTD.), which was to serve as electrodes, under pressure of 65 kg/cm² and a temperature of 200° C. for 3 mins, and finally into the shaped articles through thermal treatment at 120° C. for 1 hour. Then, said shaped articles were exposed to 10 M rad of gamma radiation and then shaped into articles measuring $l_1 = 10$ mm, $l_2 = 4.5$ mm, $t = 1.5$ mm, the shape of which is shown in FIG. 6. Thus, PTC device 3, which comprises PTC element 1 having both sides thereof metallic foil 2, was obtained.

(2) Measurement of PTC Characteristios

Next, PTC device 3 thus obtained was placed in a constant temperature oven and heated with temperature elevation speed of 1° C./min. therein, with resistivity value R at each temperature measured, and Height of PTC was computated from thus measured values R, utilizing the formula (1) below. The result of the computation is shown in Table 4. The volume resistivity $\rho_{20}$ and $\rho$ peak were calculated from the resistivity R of PTC device 3 shown in FIG. 6, utilizing the formula (2)

$$\text{Height of } PTC = \log_{10} \frac{\rho\text{peak}}{\rho_{20}} \quad (1)$$

$$\rho = R \frac{l_1 \, l_2}{t} \quad (2)$$

Separate Table 5 shows examples for comparison, according to which, the same carbon black as that of the present embodiments was combined with high density polyethylene without being made porous by means of vapor etching, but by otherwise identical procedures to produce shaped PTC devices. The resulting volume resistivities and PTC characteristics are shown in Table 5.

Comparison between the volume resistivities $\rho_{20}$ of the examples of Table 5 and the embodiments of Table 4 shows that the volume resistivites of PTC devices made porous by means of the vapor etching method according to the embodiments of the present invention are smaller in spite of the identical amounts of carbon black in the examples for comparison and the embodiments. This result indicates that the amount of carbon black filler made porous by the vapor etching method required to produce an equivalent degree of conductivity is relatively small compared with that for devices of the examples with unetched carbon black.

Figure 7:
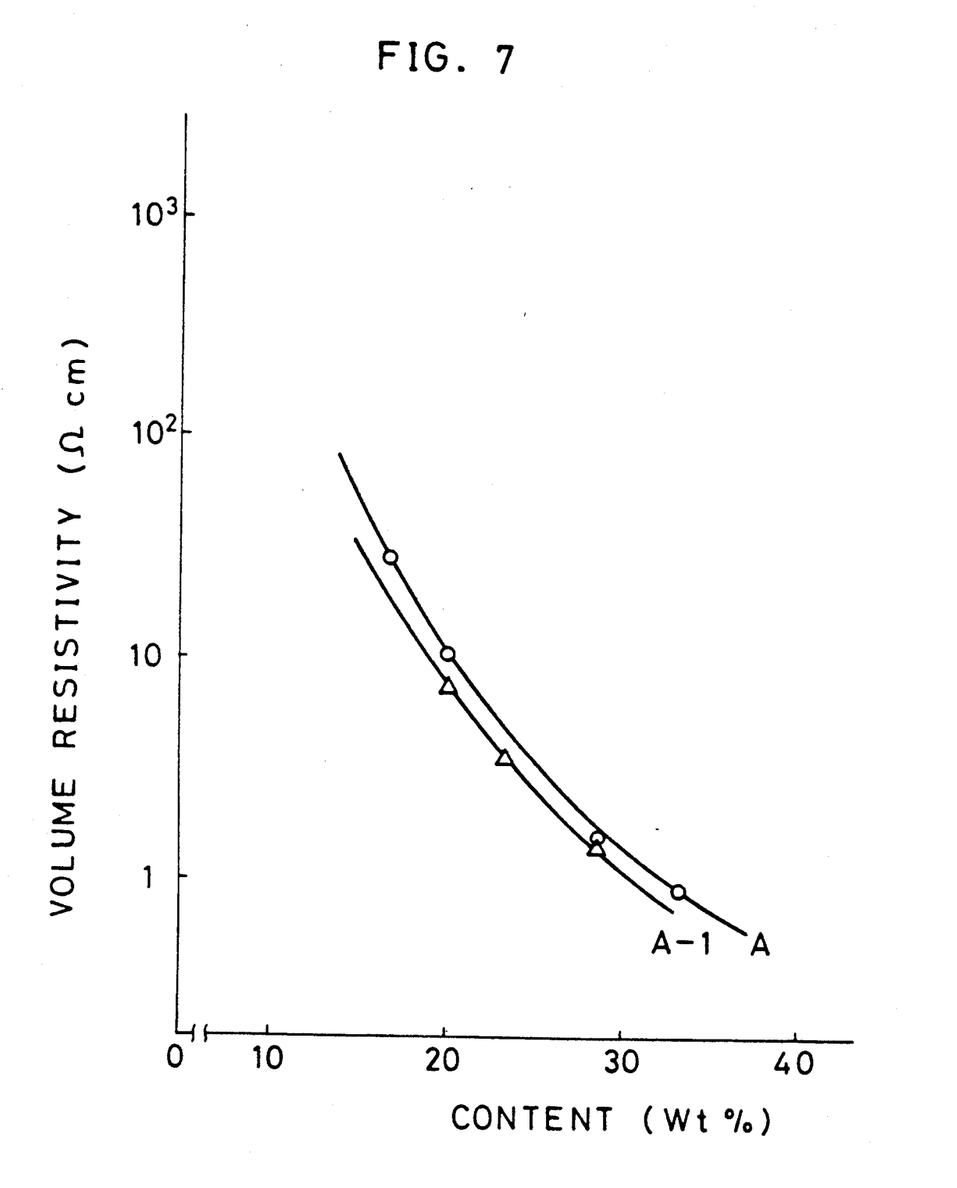
FIGS. 7 through 14 are charts showing contents of carbon blacks and porous blacks and volume resistivities of PTC devices.
Figure 8:
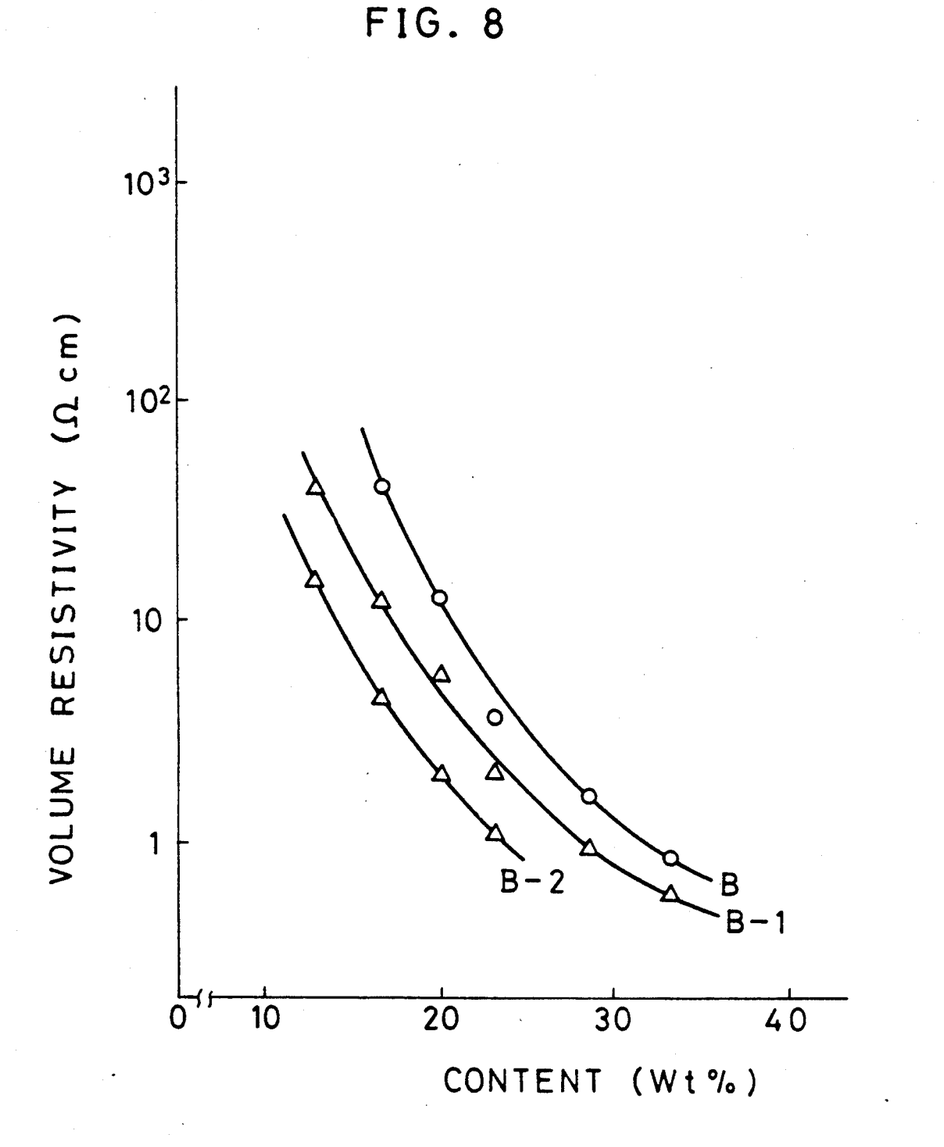
Figure 9:
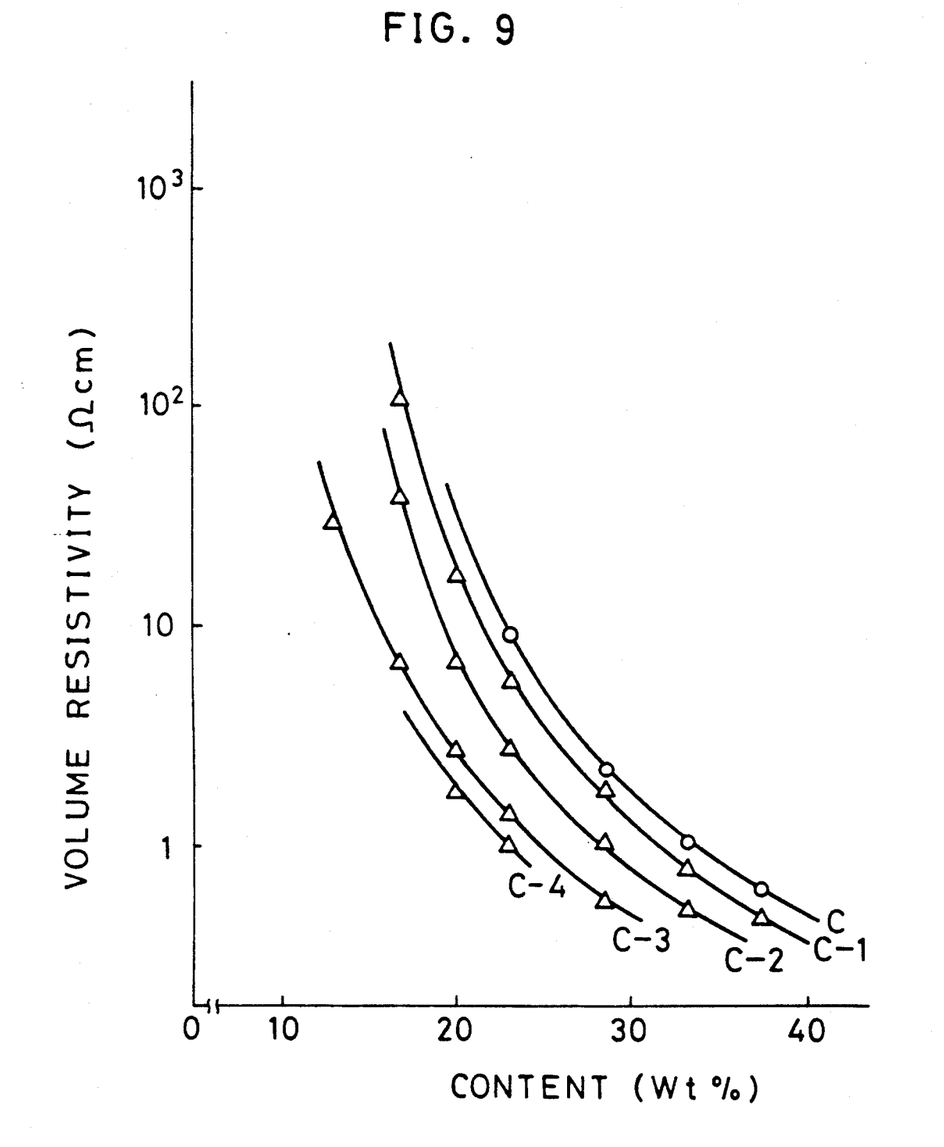
Figure 10:
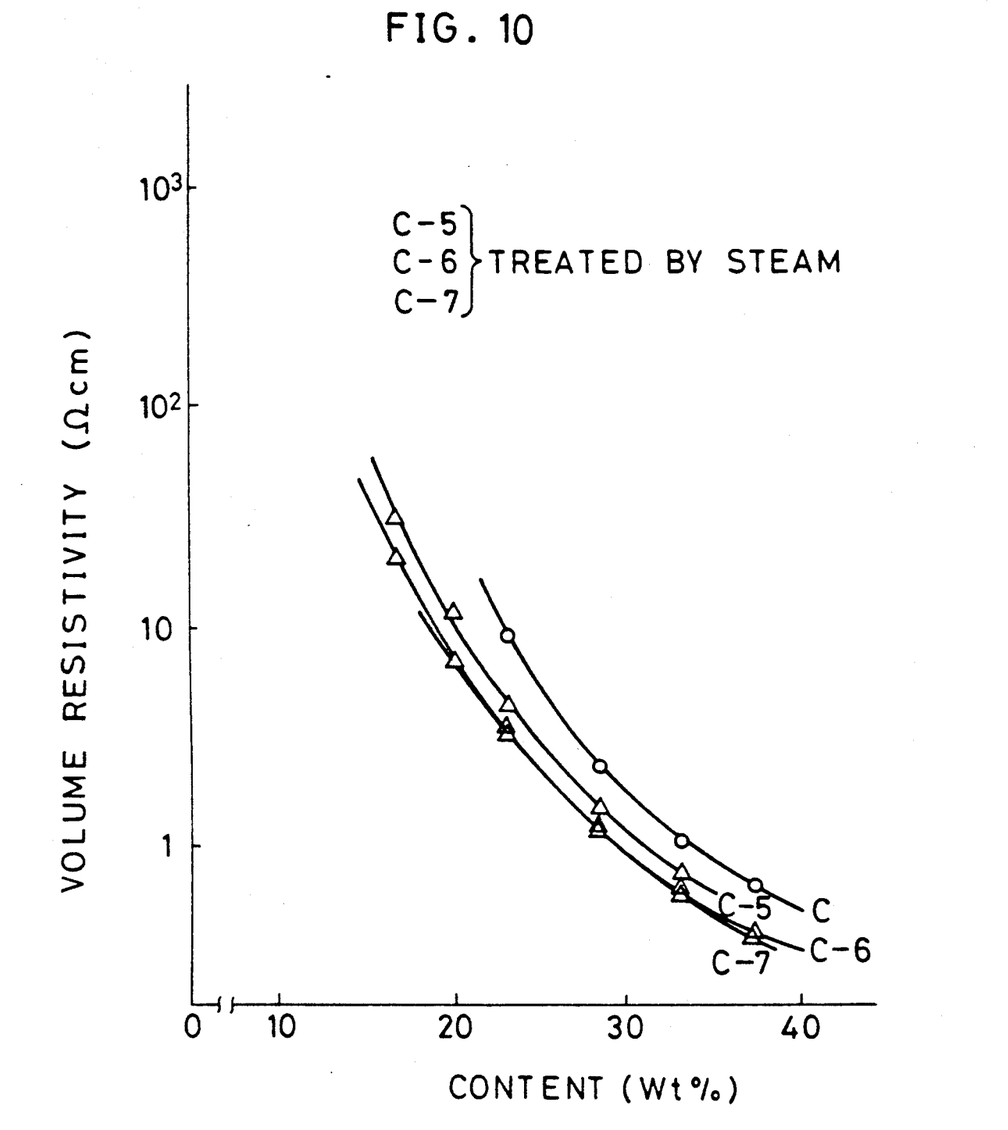
Figure 11:
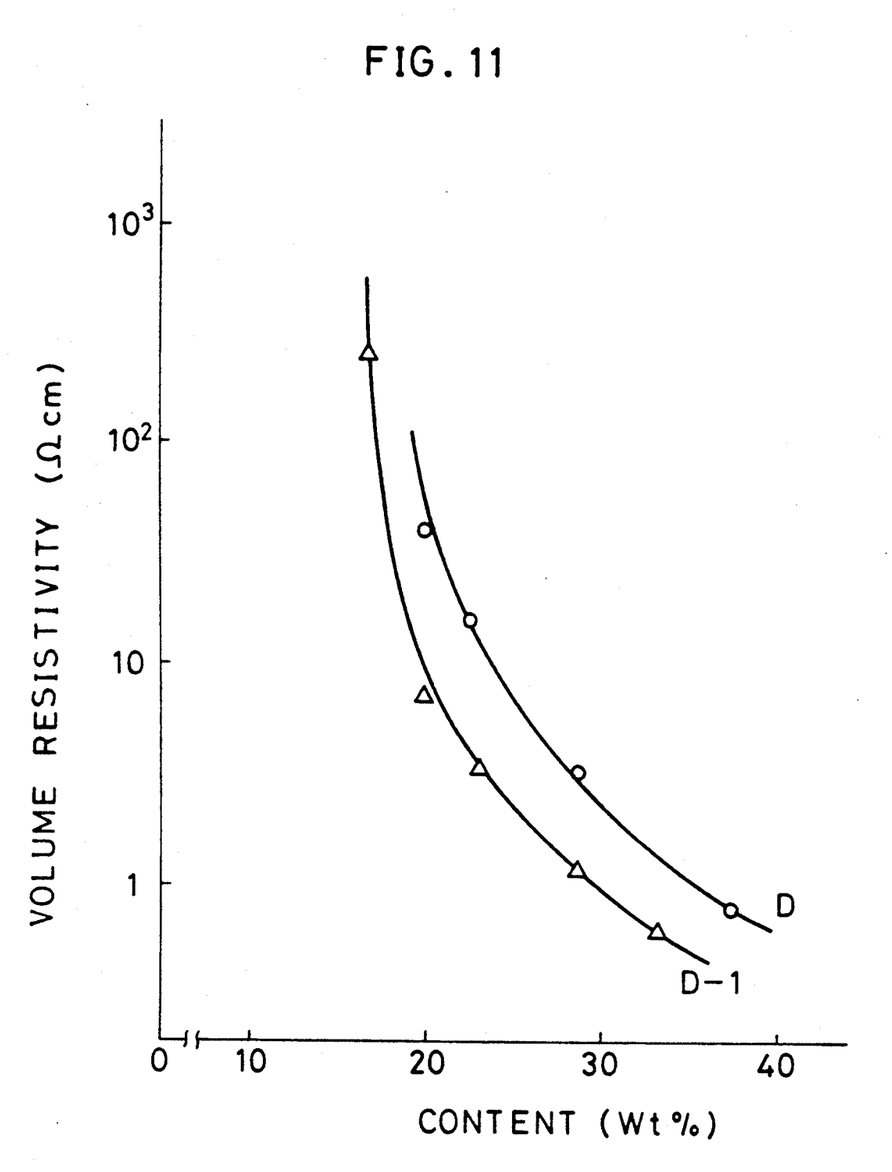
Figure 12:
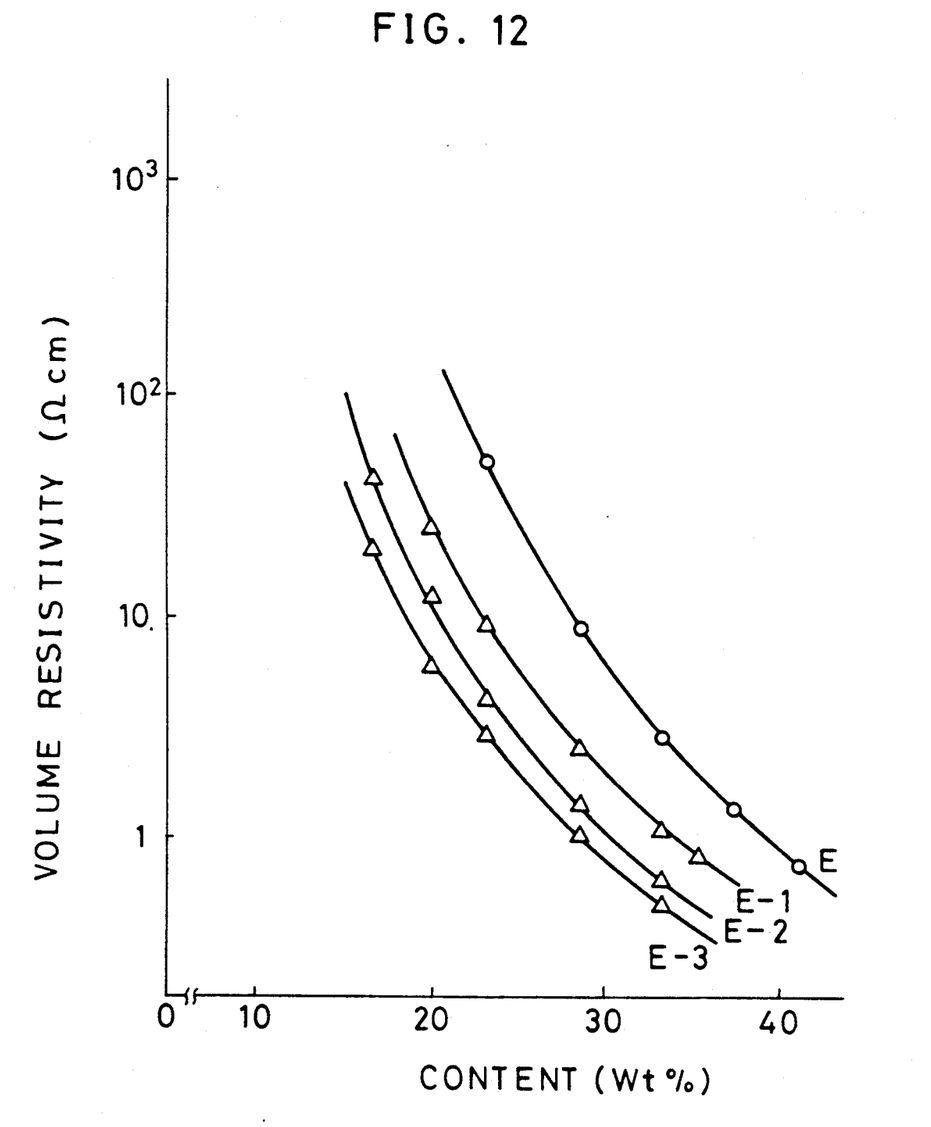
Figure 13:
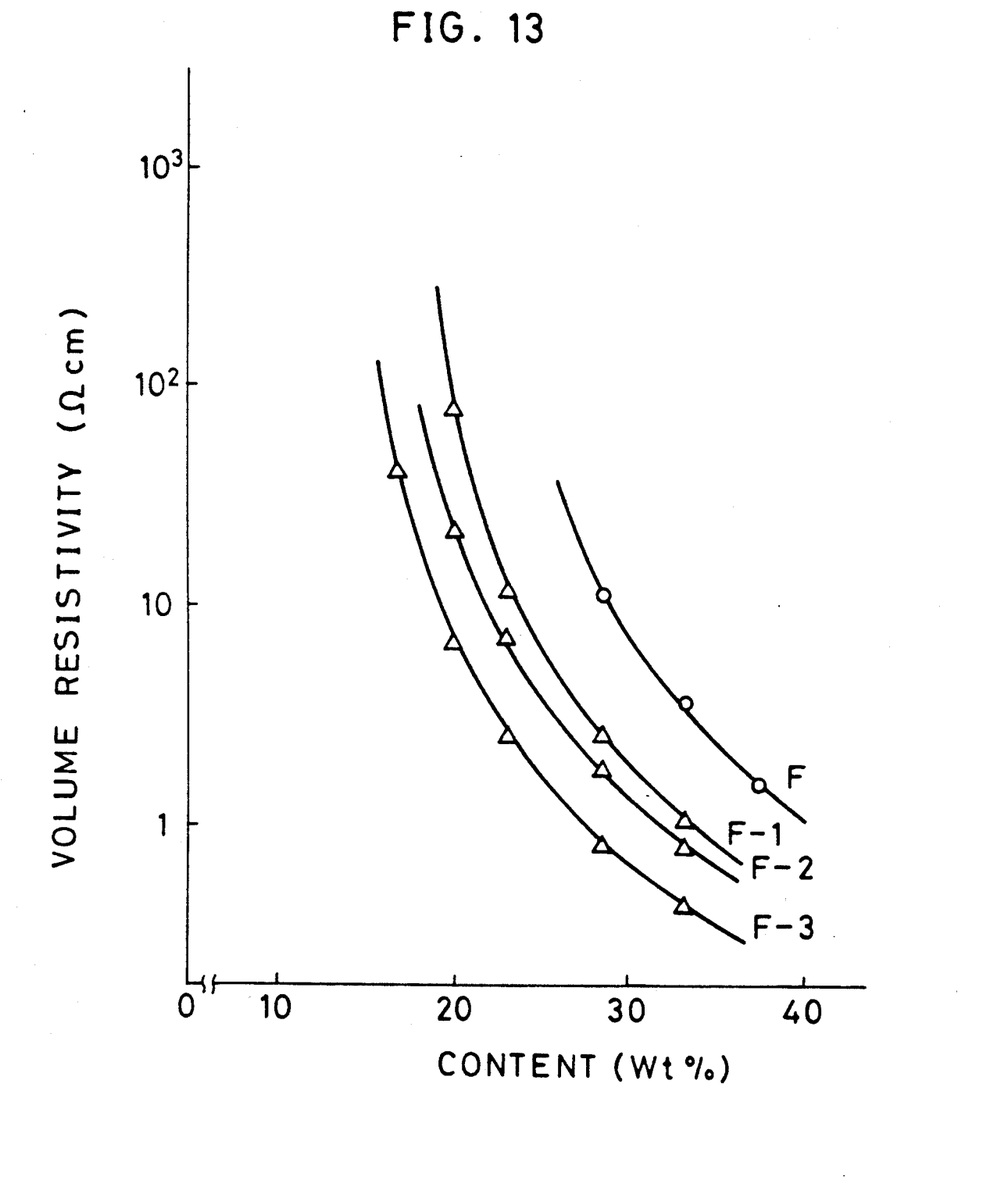
Figure 14:
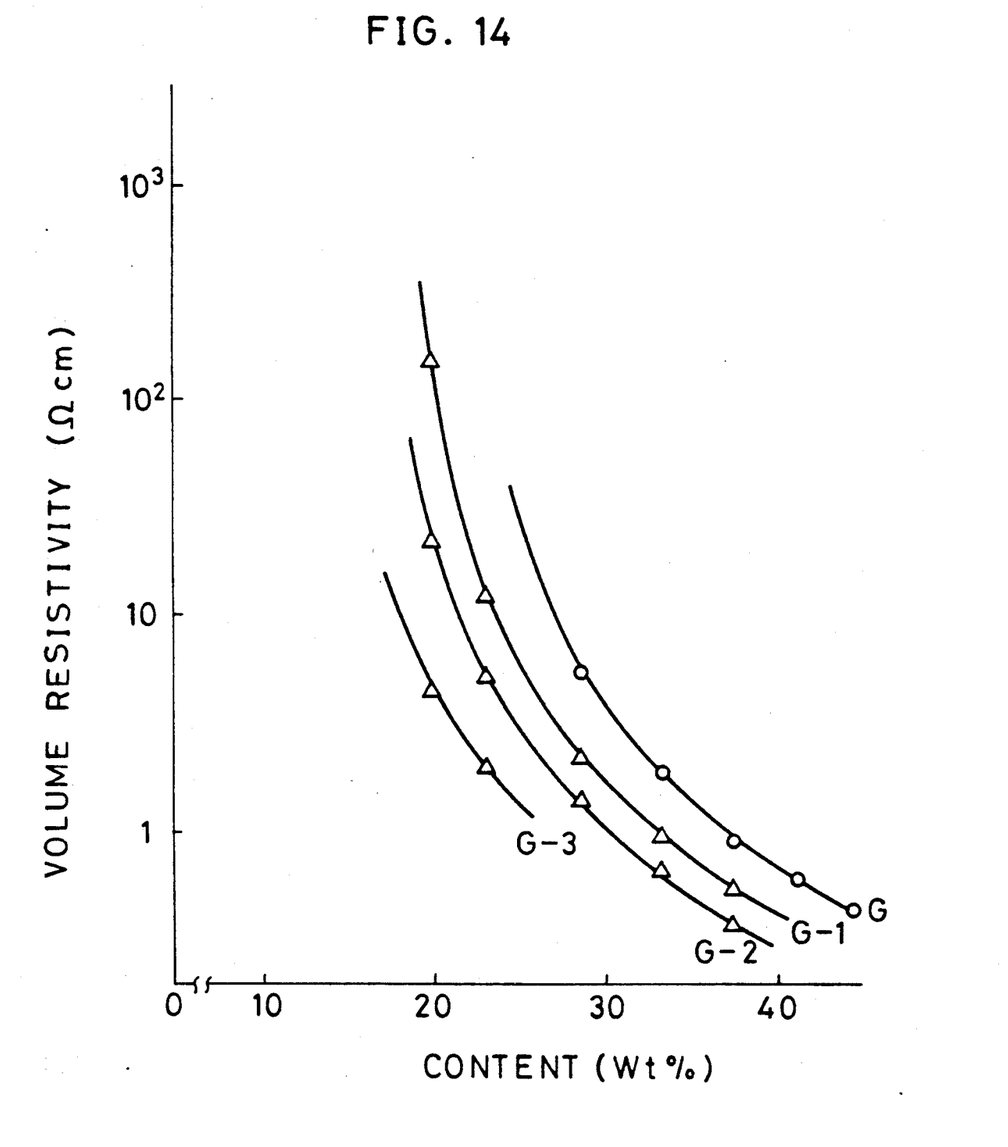

FIGS. 7 through 14 are charts concerning PTC devices of the present embodiments and those of the examples for comparison, showing the relationship between the amount of carbon black in high density polyethylene and the volume resistivity at 20° C. ($\rho_{20}$): FIG. 7 is a comparison chart of volume resistivites $\rho_{20}$ when various amounts of carbon black A and porous black A-1 were combined respectively with high density polyethylene; FIG. 8 is a comparison chart of volume resistivites $\rho_{20}$ when various amounts of carbon black B and porous blacks B-1 and B-2 were combined respectively with high density polyethylene; FIG. 9 is a comparison chart of volume resistivites $\rho_{20}$ when various amounts of carbon black C and porous blacks C-1 C-2, C-3 and C-4 were combined respectively with high density polyethylene; FIG. 10 is a comparison chart of volume resistivites $\rho_{20}$ when various amounts of carbon black C and porous blacks C-5, C-6 and C-7 were combined respectively with high density polyethylene; FIG. 11 is a comparison chart of volume resistivities $\rho_{20}$ when various amounts of carbon black D and porous black D-1 were combined respectively with high density polyethylene; FIG. 12 is a comparison chart of volume resistivites $\rho_{20}$ when various amounts of carbon black E and porous blacks E-1 E-2 and E-3 were combined respectively with high density polyethylene; FIG. 13 is a comparison chart of volume resistivites $\rho_{20}$ when various amounts of carbon black F and porous blacks F-1, F-2 and F-3 were combined respectively with high density polyethylene; FIG. 14 is a comparison chart of volume resistivites $\rho_{20}$ when various amounts of carbon black G and porous blacks G-1, G-2 and G-3 were combined respectively with high density polyethylene. All of these charts clearly show that, at the same content, the volume resistivites $\rho_{20}$ of PTC devices of the present embodiments are lower than those of the examples for comparison, where unetched carbon black itself was used.

Separate Table 6 shows the result of measuring volume resistivities $\rho_{20}$ and PTC characteristics of PTC devices produced by combining conventional carbon blacks (shown in Table 1) with high density polyethylene in the same manner as that for the present embodiments and through further identical procedures.

Comparison between Table 6 showing examples of conventional carbon blacks and Table 4 showing the embodiments proves that PTC characteristics of the conventional carbon blacks are below 1.0, except for Examples 4 and 9, while PTC characteristics of the embodiments are all above 1.0.

Figure 15:
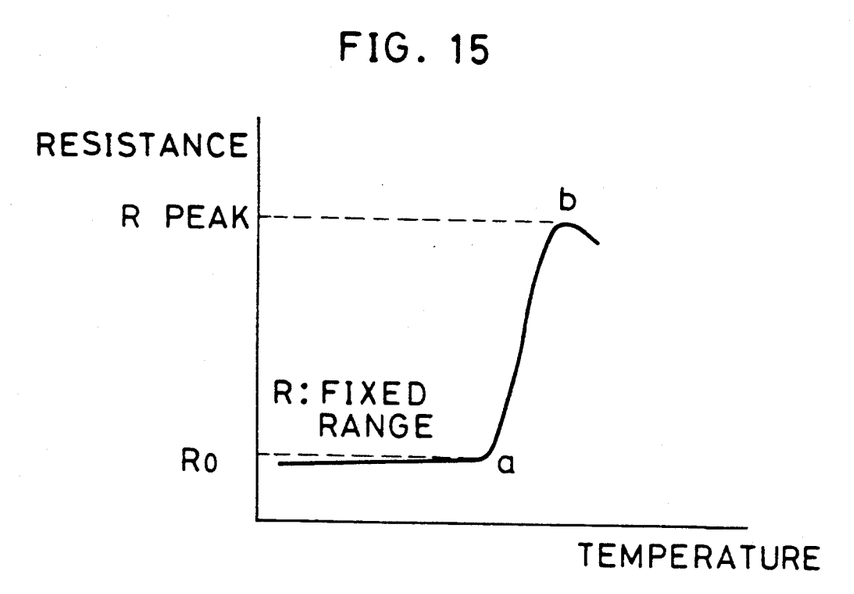
FIG. 15 is a chart showing resistivity-temperature characteristics.
Figure 16:
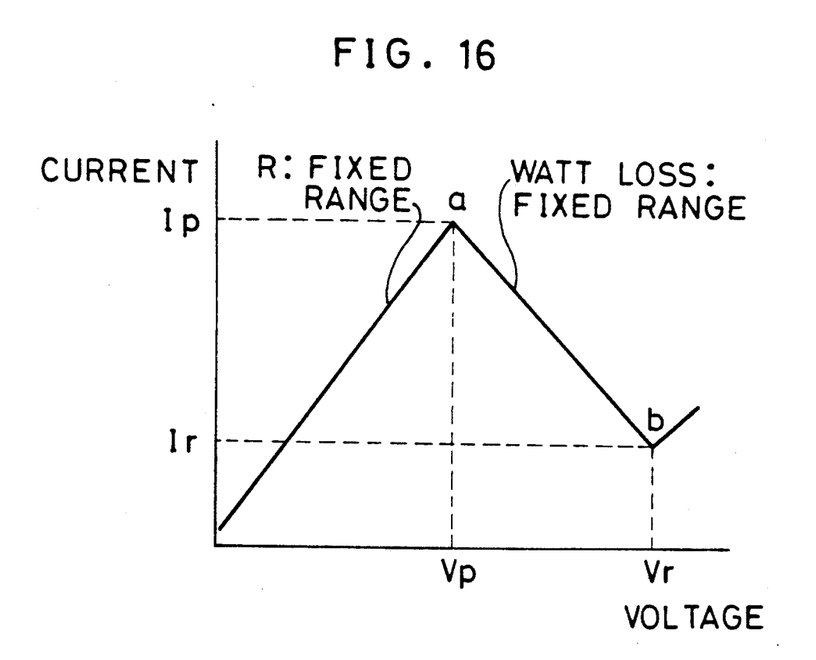
FIG. 16 is a chart showing current-voltage characteristics.

According to FIG. 15, which is a resistivity-temperature characteristics chart, and FIG. 16, which is a current-voltage characteristics chart. PTC characteristics are shown as log (Rpeak/Ro). The resistance at (a) in FIGS. 15 and 16 is Ro=Vp/Ip=VrXIr, PTC characteristics value=n=log (Rpeak/Ro)=2 log (Vr/Vp). Given that Vp is the voltage drop across a PTC device of a self-resetting overcurrent protection device and that Vr is the circuit voltage, in general cases, Vp must not be more than 20% of Vr. Therefore, as n= 2 log (Vr/Vp)=2 log (1/0.2)=1.39, a value not less than 1 is required for a device with PTC characteristics to be used as a self-resetting overcurrent protection device.

This indicates that PTC characteristics values of the examples of examples of conventional unetched carbon blacks are not sufficient for self-resetting overcurrent protection devices. All of the embodiments of the invention using etched carbon black have favorable PTC characteristics values, greater than 1.0, enabling their use as self-resetting overcurrent protection devices.

Further, carbon black and porous black were separately blended with high density polyethylene and made into shaped articles in the same manner as said embodiments and examples for comaprison, with the variation of resistance at 70° C. of elements made from said shaped articles shown in separte Tables 7 and 8 as an example. Said variation of resistance was calculated utilizing formula (3).

$$\text{variation of resistance } (\%) = \frac{\rho_{70} - \rho_{20}}{\rho_{20}} \times 100 \quad (3)$$

70° C. mentioned above is in general the highest surrounding temperature of an electrical device in use.

In case the temperature around a self-resetting overcurrent protection device in use changes, it sometimes presents a problem in that the change in resistance of the element may cause fluctuations in the voltage in the electrical circuit of the apparatus. For this reason, it is important that variation of resistance of a device be small. It is evident from the tables that the variation of resistance of the present embodiments shown in Table 7 are lower than those of the examples for comparison shown in Table 8.

Although high density polyethylene was used for crystalline polymer in the embodiments, it is possible to use alone or in combination, other kinds of polymers, such as low density polyethylene, middle density polyethylene, polypropylene, fluorocarbon polymers, poly (ethylene terephthalete), etc.

According to the present invention, since the porous carbon black produced by increasing the specific surface area of carbon black by means of the vapor etching method is porous without significant change in particle size and/or structure thereof, the content of porous carbon black dispersed in crystalline polymer to obtain equivalent volume resistivity can be relatively small. Further, since porous carbon black is obtained by making carbon black raw material porous by means of vapor etching, oil furnace black, lamp black and other kinds of carbon black with favorable PTC characteristics can be chosen freely for carbon black. Therefore, higher PTC characteristics values can be obtained compared with conventional conductive carbon black (as described in Table 1), which is obtained by making carbon black porous at the time of its formation.

Furthermore, as the variation of resistance at 70° C. of a self-resetting overcurrent protection device according to the present invention is low, it is possible to stabilize the voltage decrease of the self-resetting overcurrent protection device in relation to changes in the surrounding temperature when the current is below the rated current value.

Moreover, according to the present invention, as the volume resistivity at 20° C. of a self-resetting overcurrent protection device is set in the range of 0.4 ohm cm~150 ohm cm, the device can be designed to fit the range of 0.06A~20A, which is substantially the same as that of the rated current value of ordinary fuses.

TABLE 3

| Carbon Black | Grade | Name of Manufacturer | Particle Diameter (mµ) | Specific Surface Area (m²/g) |
|---|---|---|---|---|
| A | Asahi #80 Oil Furnace Black | Asahi Carbon Co. | 20 | 119.6 |
| B | Asahi #70 Oil Furnace Black | " | 26 | 77 |
| C | Asahi #60H Oil Furnace Black | " | 41 | 45 |
| D | Asahi #60 Oil Furnace Black | " | 45 | 40 |
| E | Asahi #55 Oil Furnace Black | " | 66 | 29.2 |
| F | Asahi #50HG Oil Furnace Black | " | 80 | 22 |
| G | Lamp Black 101 | DeGuSSa (West Germany) | 95 | 20 |

TABLE 4

| Embodiment | Porous Black | Specific Surface Area (m²/g) | Specific Surface Area Magnitude | Porous Black Content (wt %) | Volume Resistivity $\rho_{20}$ ($\Omega$cm) | PTC Characteristics $\log\left(\frac{\rho_{peak}}{\rho_{20}}\right)$ |
|---|---|---|---|---|---|---|
| 1 | A-1 | 860 | 7.1 | 28.6 | 1.55 | 1.46 |
| 2 | A-1 | 860 | 7.1 | 23.1 | 3.88 | 1.74 |
| 3 | A-1 | 860 | 7.1 | 20 | 7.86 | 2.16 |
| 4 | B-1 | 187 | 2.4 | 33.3 | 0.61 | 2.61 |
| 5 | B-1 | 187 | 2.4 | 28.6 | 0.97 | 2.82 |
| 6 | B-1 | 187 | 2.4 | 23.1 | 2.11 | 3.39 |
| 7 | B-1 | 187 | 2.4 | 20 | 5.87 | 4.26 |
| 8 | B-1 | 187 | 2.4 | 16.7 | 12.6 | 4.87 |
| 9 | B-1 | 187 | 2.4 | 13.0 | 40.7 | 7.33 |
| 10 | B-2 | 1140 | 14.8 | 23.1 | 1.13 | 1.59 |
| 11 | B-2 | 1140 | 14.8 | 20 | 2.08 | 2.02 |
| 12 | B-2 | 1140 | 14.8 | 16.7 | 4.63 | 2.33 |
| 13 | B-2 | 1140 | 14.8 | 13 | 15.2 | 3.19 |
| 14 | C-1 | 65.4 | 1.5 | 37.5 | 0.52 | 2.62 |
| 15 | C-1 | 65.4 | 1.5 | 33.3 | 0.87 | 3.31 |
| 16 | C-1 | 65.4 | 1.5 | 28.6 | 1.92 | 4.64 |
| 17 | C-1 | 65.4 | 1.5 | 23.1 | 6.02 | 5.51 |
| 18 | C-1 | 65.4 | 1.5 | 20 | 17.9 | >7.79 |
| 19 | C-1 | 65.4 | 1.5 | 16.7 | 111 | >6.89 |
| 20 | C-2 | 415 | 9.2 | 33.3 | 0.56 | 2.28 |
| 21 | C-2 | 415 | 9.2 | 28.6 | 1.1 | 3.0 |
| 22 | C-2 | 415 | 9.2 | 23.1 | 3.0 | 4.02 |
| 23 | C-2 | 415 | 9.2 | 20 | 7.3 | 5.31 |
| 24 | C-2 | 415 | 9.2 | 16.7 | 40 | >7.6 |
| 25 | C-3 | 813 | 18.1 | 28.6 | 0.61 | 2.07 |
| 26 | C-3 | 813 | 18.1 | 23.1 | 1.49 | 2.78 |
| 27 | C-3 | 813 | 18.1 | 20 | 2.89 | 3.33 |
| 28 | C-3 | 813 | 18.1 | 16.7 | 7.14 | 4.81 |
| 29 | C-3 | 813 | 18.1 | 13 | 30.5 | 7.52 |
| 30 | C-4 | 983 | 21.8 | 23.1 | 1.09 | 2.04 |
| 31 | C-4 | 983 | 21.8 | 20 | 1.83 | 2.24 |
| 32 | C-5 | 408 | 9.1 | 33.3 | 0.79 | 2.63 |
| 33 | C-5 | 408 | 9.1 | 28.6 | 1.58 | 3.0 |
| 34 | C-5 | 408 | 9.1 | 23.1 | 4.64 | 5.48 |
| 35 | C-5 | 408 | 9.1 | 20 | 12.1 | 7.29 |
| 36 | C-5 | 408 | 9.1 | 16.7 | 32 | 7.51 |
| 37 | C-6 | 528 | 11.7 | 37.5 | 0.43 | 1.39 |
| 38 | C-6 | 528 | 11.7 | 33.3 | 0.68 | 1.74 |
| 39 | C-6 | 528 | 11.7 | 28.6 | 1.30 | 2.39 |
| 40 | C-6 | 528 | 11.7 | 23.1 | 3.63 | 3.16 |
| 41 | C-6 | 528 | 11.7 | 20 | 7.43 | 3.72 |
| 42 | C-6 | 528 | 11.7 | 16.7 | 21.3 | 5.16 |
| 43 | C-7 | 630 | 14 | 37.5 | 0.41 | 1.69 |
| 44 | C-7 | 630 | 14 | 33.3 | 0.64 | 2.28 |
| 45 | C-7 | 630 | 14 | 28.6 | 1.25 | 2.53 |
| 46 | C-7 | 630 | 14 | 23.1 | 3.46 | 4.04 |
| 47 | C-7 | 630 | 14 | 20 | 7.36 | 4.78 |
| 48 | D-1 | 451 | 11 | 33.3 | 0.66 | 2.15 |
| 49 | D-1 | 451 | 11 | 28.6 | 1.24 | 3.0 |
| 50 | D-1 | 451 | 11 | 23.1 | 3.56 | 5.14 |
| 51 | D-1 | 451 | 11 | 20 | 7.37 | 7.66 |
| 52 | D-1 | 451 | 11 | 16.7 | 25.9 | >7.6 |
| 53 | E-1 | 173.7 | 6.0 | 35.5 | 0.88 | 3.8 |
| 54 | E-1 | 173.7 | 6.0 | 33.3 | 1.16 | 3.9 |
| 55 | E-1 | 173.7 | 6.0 | 28.6 | 2.77 | 5.7 |
| 56 | E-1 | 173.7 | 6.0 | 23.1 | 9.85 | >8 |
| 57 | E-1 | 173.7 | 6.0 | 20 | 26.6 | >7.6 |
| 58 | E-2 | 489 | 16.7 | 33.3 | 0.68 | 2.92 |
| 59 | E-2 | 489 | 16.7 | 28.6 | 1.5 | 3.37 |
| 60 | E-2 | 489 | 16.7 | 23.1 | 4.5 | 6.35 |
| 61 | E-2 | 489 | 16.7 | 20 | 13 | >7.9 |
| 62 | E-2 | 489 | 16.7 | 16.7 | 44 | >7.4 |
| 63 | E-3 | 659 | 22.6 | 33.3 | 0.53 | 2.11 |
| 64 | E-3 | 659 | 22.6 | 28.6 | 1.1 | 2.72 |
| 65 | E-3 | 659 | 22.6 | 23.1 | 3.1 | 4.44 |
| 66 | E-3 | 659 | 22.6 | 20 | 6.3 | 5.9 |
| 67 | E-3 | 659 | 22.6 | 16.7 | 21 | >7.8 |
| 68 | F-1 | 220.7 | 10 | 33.3 | 1.11 | 4.16 |
| 69 | F-1 | 220.7 | 10 | 28.6 | 2.69 | 8.48 |
| 70 | F-1 | 220.7 | 10 | 23.1 | 12.1 | >7.8 |
| 71 | F-1 | 220.7 | 10 | 20 | 81.7 | >6.9 |
| 72 | F-2 | 449 | 20.4 | 33.3 | 0.85 | 3.65 |
| 73 | F-2 | 449 | 20.4 | 28.6 | 1.9 | 6.29 |
| 74 | F-2 | 449 | 20.4 | 23.1 | 7.47 | >8.1 |
| 75 | F-2 | 449 | 20.4 | 20 | 22.3 | >7.6 |
| 76 | F-3 | 945 | 43 | 33.3 | 0.46 | 2.01 |
| 77 | F-3 | 945 | 43 | 28.6 | 0.86 | 2.7 |

TABLE 4-continued

| Embodiment | Porous Black | Specific Surface Area (m²/g) | Specific Surface Area Magnitude | Porous Black Content (wt %) | Volume Resistivity $\rho_{20}$ (Ωcm) | PTC Characteristics $\log\left(\frac{\rho\text{peak}}{\rho_{20}}\right)$ |
| --- | --- | --- | --- | --- | --- | --- |
| 78 | F-3 | 945 | 43 | 23.1 | 2.67 | 4.58 |
| 79 | F-3 | 945 | 43 | 20 | 7.08 | 6.49 |
| 80 | F-3 | 945 | 43 | 16.7 | 42.1 | >7.6 |
| 81 | G-1 | 66.1 | 3.3 | 37.5 | 0.56 | 3.48 |
| 82 | G-1 | 66.1 | 3.3 | 33.3 | 0.99 | 3.9 |
| 83 | G-1 | 66.1 | 3.3 | 28.6 | 2.34 | 5.82 |
| 84 | G-1 | 66.1 | 3.3 | 23.1 | 12.7 | >7.9 |
| 85 | G-1 | 66.1 | 3.3 | 20 | 153 | >5.8 |
| 86 | G-2 | 420 | 21 | 37.5 | 0.38 | 2.65 |
| 87 | G-2 | 420 | 21 | 33.3 | 0.68 | 2.75 |
| 88 | G-2 | 420 | 21 | 28.6 | 1.48 | 3.92 |
| 89 | G-2 | 420 | 21 | 23.1 | 5.55 | >8.1 |
| 90 | G-2 | 420 | 21 | 20 | 22.3 | >7.5 |
| 91 | G-3 | 930 | 46.5 | 23.1 | 2.1 | 3.23 |
| 92 | G-3 | 930 | 46.5 | 20 | 4.72 | 4.25 |

TABLE 5

| Example for Comparison | Carbon Black | Specific Surface Area (m²/g) | Carbon Black Content (wt %) | Volume Resistivity $\rho_{20}$ (Ωcm) | PTC Characteristics $\log\left(\frac{\rho\text{peak}}{\rho_{20}}\right)$ |
| --- | --- | --- | --- | --- | --- |
| 1 | A | 119.6 | 33.3 | 0.96 | 2.34 |
| 2 | A | 119.6 | 28.6 | 1.63 | 2.63 |
| 3 | A | 119.6 | 20 | 10.8 | 3.58 |
| 4 | A | 119.6 | 16.7 | 29.3 | 5.44 |
| 5 | B | 77 | 37.5 | 0.88 | 2.77 |
| 6 | B | 77 | 33.3 | 1.66 | 3.26 |
| 7 | B | 77 | 28.6 | 3.73 | 4.36 |
| 8 | B | 77 | 23.1 | 12.9 | 6.16 |
| 9 | B | 77 | 20 | 41.5 | >7.3 |
| 10 | C | 45 | 37.5 | 0.69 | 2.82 |
| 11 | C | 45 | 33.3 | 1.1 | 3.71 |
| 12 | C | 45 | 28.6 | 2.4 | 4.08 |
| 13 | C | 45 | 23.1 | 9.6 | 7.26 |
| 14 | D | 40 | 37.5 | 0.83 | 3.36 |
| 15 | D | 40 | 28.6 | 3.33 | 6.34 |
| 16 | D | 40 | 23.1 | 16.0 | >7.9 |
| 17 | D | 40 | 20 | 40.8 | >7.5 |
| 18 | E | 29.2 | 41.2 | 0.8 | 4.62 |
| 19 | E | 29.2 | 37.5 | 1.42 | 5.59 |
| 20 | E | 29.2 | 33.3 | 3.04 | 6.76 |
| 21 | E | 29.2 | 28.6 | 9.5 | 8.1 |
| 22 | E | 29.2 | 23.1 | 53 | 7.6 |
| 23 | F | 22 | 37.5 | 1.59 | 5.69 |
| 24 | F | 22 | 33.3 | 3.77 | >8.5 |
| 25 | F | 22 | 28.6 | 11.5 | >8 |
| 26 | G | 20 | 50 | 0.21 | 2.68 |
| 27 | G | 20 | 47.4 | 0.3 | 2.89 |
| 28 | G | 20 | 44.4 | 0.4 | 3.29 |
| 29 | G | 20 | 41.2 | 0.61 | 3.85 |
| 30 | G | 20 | 37.5 | 0.93 | 4.93 |
| 31 | G | 20 | 33.3 | 1.93 | >7.9 |
| 32 | G | 20 | 28.6 | 5.67 | >8.4 |

TABLE 6

| Example of Conventional Carbon Black | Carbon Black | Specific Surface Area (m²/g) | Carbon Black Content (wt %) | Volume Resistivity $\rho_{20}$ (Ωcm) | PTC Characteristics $\log\left(\frac{\rho\text{peak}}{\rho_{20}}\right)$ |
| --- | --- | --- | --- | --- | --- |
| 1 | Black Pearls 2000 | 1475 | 28.6 | 0.61 | 0.52 |
| 2 | Black Pearls 2000 | 1475 | 23.1 | 1.31 | 0.66 |
| 3 | Black Pearls 2000 | 1475 | 16.7 | 4.76 | 0.74 |
| 4 | Black Pearls 2000 | 1475 | 9.1 | 84.4 | 1.14 |
| 5 | Conductex 40-220 | 1066 | 33.3 | 0.46 | 0.34 |
| 6 | Conductex 40-220 | 1066 | 28.6 | 1.09 | 0.7 |
| 7 | Conductex 40-220 | 1066 | 23.1 | 2.5 | 0.73 |
| 8 | Conductex 40-220 | 1066 | 16.7 | 9.2 | 0.85 |
| 9 | Conductex 40-220 | 1066 | 9.1 | 242 | 1.82 |
| 10 | Ketjen Black EC | 950 | 33.3 | 0.25 | 0.23 |
| 11 | Ketjen Black EC | 950 | 28.6 | 0.43 | 0.54 |
| 12 | Ketjen Black EC | 950 | 23.1 | 0.85 | 0.7 |

TABLE 6-continued

| Example of Conventional Carbon Black | Carbon Black | Specific Surface Area (m²/g) | Carbon Black Content (wt %) | Volume Resistivity $\rho_{20}$ ($\Omega$cm) | PTC Characteristics $\log\left(\frac{\rho_{peak}}{\rho_{20}}\right)$ |
|---|---|---|---|---|---|
| 13 | Ketjen Black EC | 950 | 16.7 | 2.81 | 0.91 |

TABLE 7

| Embodiment | Porous Black | Specific Surface Area Magnitude | Porous Black Content (wt %) | Volume Resistivity (at 20° C.) $\rho_{20}$ ($\Omega$cm) | Variation of Resistance (%) |
|---|---|---|---|---|---|
| 53 | E-1 | 6.0 | 35.5 | 0.88 | 22.0 |
| 54 | E-1 | 6.0 | 33.3 | 1.16 | 19.7 |
| 55 | E-1 | 6.0 | 28.6 | 2.77 | 23.9 |
| 56 | E-1 | 6.0 | 23.1 | 9.85 | 30.2 |
| 57 | E-1 | 6.0 | 20 | 26.6 | 36.5 |
| 58 | E-2 | 16.7 | 33.3 | 0.68 | 17.6 |
| 59 | E-2 | 16.7 | 28.6 | 1.5 | 15.5 |
| 60 | E-2 | 16.7 | 23.1 | 4.5 | 17.8 |
| 61 | E-2 | 16.7 | 20 | 13 | 20.5 |
| 62 | E-2 | 16.7 | 16.7 | 44 | 26.9 |
| 63 | E-3 | 22.6 | 33.3 | 0.53 | 13.2 |
| 64 | E-3 | 22.6 | 28.6 | 1.1 | 13.1 |
| 65 | E-3 | 22.6 | 23.1 | 3.1 | 11.7 |
| 66 | E-3 | 22.6 | 20 | 6.3 | 12.3 |
| 67 | E-3 | 22.6 | 16.7 | 21 | 14.8 |
| 68 | F-1 | 10 | 33.3 | 1.11 | 17.0 |
| 69 | F-1 | 10 | 28.6 | 2.69 | 19.6 |
| 70 | F-1 | 10 | 23.1 | 12.1 | 27.5 |
| 71 | F-1 | 10 | 20 | 81.7 | 58.7 |
| 72 | F-2 | 20.4 | 33.3 | 0.85 | 13.4 |
| 73 | F-2 | 20.4 | 28.6 | 1.9 | 13.5 |
| 74 | F-2 | 20.4 | 23.1 | 7.47 | 18.2 |
| 75 | F-2 | 20.4 | 20 | 22.3 | 24.9 |
| 76 | F-3 | 43 | 33.3 | 0.46 | 10.2 |
| 77 | F-3 | 43 | 28.6 | 0.86 | 7.87 |
| 78 | F-3 | 43 | 23.1 | 2.67 | 7.04 |
| 79 | F-3 | 43 | 20 | 7.08 | 8.18 |
| 80 | F-3 | 43 | 16.7 | 42.1 | 12.9 |

TABLE 8

| Example for Comparison | Carbon Black | Specific Surface Area (m²/g) | Carbon Black Content (wt %) | Volume Resistivity $\rho_{20}$ ($\Omega$cm) | Variation of Resistance (%) |
|---|---|---|---|---|---|
| 18 | E | 29.2 | 41.2 | 0.8 | 20.0 |
| 19 | E | 29.2 | 37.5 | 1.42 | 22.8 |
| 20 | E | 29.2 | 33.3 | 3.04 | 27.5 |
| 21 | E | 29.2 | 28.6 | 9.5 | 30.4 |
| 22 | E | 29.2 | 23.1 | 53 | 39.7 |
| 23 | F | 22 | 37.5 | 1.59 | 21.9 |
| 24 | F | 22 | 33.3 | 3.77 | 24.5 |
| 25 | F | 22 | 28.6 | 11.5 | 29.3 |

What is claimed is:

1. A method for producing a PTC composition comprising:
    vapor etching a carbon black to increase its specific surface area, thereby to produce a porous carbon black; and
    blending said porous carbon black with a crystalline polymer.

2. A method according to claim 1, wherein the step of vapor etching includes increasing said specific surface area by at least 1.5 times.

3. A method according to claim 1 wherein said carbon black is one of furnace black and lamp black.

4. A method according to claim 1, further comprising blending said porous carbon black with said crystalline polymer to form a composition having a volume resistivity of from about 0.4 to about 150 ohm cm.

5. A method according to claim 1, wherein the step of etching includes etching using live steam.

6. A method according to claim 1, wherein the step of etching includes etching at a temperature of at lease 850 degrees C.

7. A method according to claim 1, wherein the step of etching includes etching at a temperature of from about 850 to about 950 degrees C.

* * * * *